US008941728B2

(12) United States Patent
Zitterbart et al.

(10) Patent No.: US 8,941,728 B2
(45) Date of Patent: Jan. 27, 2015

(54) METHOD FOR AUTOMATED REAL-TIME ACQUISITION OF MARINE MAMMALS

(75) Inventors: Daniel Paranhos Zitterbart, Baiersdorf (DE); Lars Kindermann, Bremerhaven (DE); Olaf Boebel, Bramstedt (DE)

(73) Assignee: Alfred-Wegener-Institut Helmholtz-Zentrum fuer Polar—und Meeresforschung, Bremerhaven (DE)

( * ) Notice: Subject to any disclaimer, the term of this patent is extended or adjusted under 35 U.S.C. 154(b) by 298 days.

(21) Appl. No.: 13/616,971

(22) Filed: Sep. 14, 2012

(65) Prior Publication Data

US 2013/0070079 A1 Mar. 21, 2013

Related U.S. Application Data

(60) Provisional application No. 61/536,131, filed on Sep. 19, 2011.

(30) Foreign Application Priority Data

Sep. 18, 2011 (DE) .......................... 10 2011 114 084

(51) Int. Cl.
*H04N 7/18* (2006.01)
*G06K 9/32* (2006.01)
*G06K 9/00* (2006.01)
*G06K 9/62* (2006.01)

(52) U.S. Cl.
CPC ............... *G06K 9/3241* (2013.01); *G06K 9/00* (2013.01); *G06K 9/6269* (2013.01); *G06K 9/6247* (2013.01)
USPC .......................................................... 348/81

(58) Field of Classification Search
CPC ................................................... H04N 5/2252

USPC ........................................................... 348/81
See application file for complete search history.

(56) References Cited

U.S. PATENT DOCUMENTS

| 5,534,694 | A  | * | 7/1996  | Ball et al. ...................... 250/330 |
| 6,016,119 | A  | * | 1/2000  | Krasner ................... 342/357.34 |
| 7,085,994 | B2 | * | 8/2006  | Gvily ............................ 715/234 |
| 7,961,906 | B2 | * | 6/2011  | Ruedin ........................ 382/103 |
| 8,544,120 | B1 | * | 10/2013 | Apgar et al. ...................... 2/458 |

(Continued)

OTHER PUBLICATIONS

C.-C. Chang and C.-J. Lin: "LIBSVM: A Library for Support Vector Machines", 2001, p. 1-39.

(Continued)

*Primary Examiner* — Sath V Perungavoor
*Assistant Examiner* — James Pontius
(74) *Attorney, Agent, or Firm* — Leydig, Voit & Mayer, Ltd.

(57) ABSTRACT

A method for automated real-time acquisition of a marine mammal in a natural body of water in the surroundings of a vessel includes detecting a thermal signature of the marine mammal is detected by imaging thermographic scanning of a water surface with an infrared camera system so as to generate an image data stream of consecutive images. A modular processing of the image data stream is performed including performing an image pre-processing, detecting local changes in contrast in the images, classifying the detected local changes in contrast so as to detect a pattern of the thermal signature of the marine mammal, localizing the classified thermal signature of the marine mammal, verifying the classified, localized thermal signature of the marine mammal and documenting the classified, localized and verified thermal signature of the marine mammal.

21 Claims, 9 Drawing Sheets

(56) References Cited

U.S. PATENT DOCUMENTS

2008/0292192 A1* 11/2008 Seki .......................... 382/199
2010/0046326 A1   2/2010 Lovik et al.

OTHER PUBLICATIONS

"Automatic time-picking of first arrivals on noisy microseismic data" of J. Wong et al., Conference Abstract 15 Canadian Society of Exploration Geophysicists CSEG Microseismic Workshop 2009.

"Automatic time-picking of Microseismic Data Combining STA/LTA and the Stationary Discrete Wavelet Transform" of I.R. Rodriguez, Dec. 2011 CSPG CSEG CWLS Convention.

Marc Ritter, Mar. 19, 2007, Chemnitz 25 University of Applied Sciences, thesis cited in "Entwurf eines Echtzeit-Bildverarbeitungssystems zur automatischen Erkennung von Walen im Umfeld der Antarktis" by Marc Ritter in "15 Jahre Künstliche Intelligenz an der TU Chemnitz" CSR-08-01, pp. 231-250 Apr. 2008.

"MAPS: an Automated Whale Detection System for Mitigation Purposes" (of D.P. Zitterbart et al., SEG (Society of Exploration Geophysicists) Expanded Abstracts 30, 67 (Dec. 2011) to International Exhibition and 81st Annual Meeting, San Antonio, USA, Sep. 18-23, 2011; initial publication on the Internet; doi:10.1190/1.3628169).

Keith Dartez, "Infrared whale counting" (Apr. 21, 2009).

\* cited by examiner

METHOD FOR AUTOMATED REAL-TIME ACQUISITION OF MARINE MAMMALS

CROSS-REFERENCE TO PRIOR APPLICATIONS

Priority is claimed to U.S. Provisional Application No. 61/536,131 filed on Sep. 19, 2011, and to German Application No. 10 2011 114 084 filed on Sep. 18, 2011, the entire disclosure of each of the applications being hereby incorporated by reference herein.

FIELD

The invention relates to a method for automated real-time acquisition of marine mammals in natural bodies of water in the vicinity of a vessel.

BACKGROUND

Marine mammals (sea mammals) include all mammals, which have readjusted to life in the sea, in particular also all types of whales and seals. In that, especially the whales are extremely threatened with extinction. Besides direct visual detection, such marine mammals can above all also be recognized by their thermal signatures, i.e. signatures generated by heat, like in particular emerging body parts, like fins and flukes, whale blow (body-temperature breathing air exhaled from the blowhole) and so-called "footprints", i.e. turbulences of the water in the track of the animal). Due to increasing concerns in regards to the impacts of anthropogenic work generating underwater noise (like, e.g., ramming work for wind farms or hydro-acoustic explorations of the oil and gas industries) on marine mammals, e.g. for seismic-geophysical investigations within the EEZ (Exclusive Economic Zone) of the US and the UK, it is demanded to switch off seismic cannons ("air-guns") in the presence of marine mammals in a radius of typically 1 km to 3 km, the so-called "mitigation radius". Prior to using air-guns, a mammal-free observation period of 30 min is furthermore demanded. Whether marine mammals are present within the mitigation radius or are at risk of getting in there, currently is normally detected during the day by visual observations of up to three observers working simultaneously. During the night or with reduced visibility (visual range, reflections, lighting conditions) or weather conditions (wind, fog, rough seas), visual observation, however, cannot be realized. Even with sufficient visibility, visual observations across the entire horizon, which usually take place over longer periods of time, require highest concentration of the observers, since the thermal signature of the marine mammal to be detected is mostly only visible for a few seconds against the often very variable background of the waves. Therefore, due to fatigue setting in quickly, each observer can only be deployed for observation for a relatively short time. Therefore, there increasingly are attempts to use automatic systems with cameras and automatic analysis of the recorded images. In that, previous attempts have been mainly concentrating on thermographic methods, in which infrared cameras are used as image sources.

Hereinafter, first, a few basic definitions of terms used are listed, as they are familiar to the skilled person.

A classification, typification or systematics is a methodical collection of abstract classes (also concepts, types or categories) used for differentiation and organization. The individual classes are normally established by means of classification, i.e. by the division of objects on the basis of certain characteristics, and hierarchically arranged. The quantity of class names forms a controlled vocabulary. Applying a classification to an object by selecting a matching class of the given classification is called grading.

Verifying or verification is the proof that an assumed or asserted fact is true. The term is used differently, depending on whether in the establishment of the truth one only wants to rely on evidence put forward or also considers the confirming examination and certification of the fact, which is easier realizable in practice, by arguments of an independent authority as verification (compare Wikipedia; key word "verification"), which is given in the present case.

Monitored learning is a subarea of machine learning. In that, learning means the ability to reproduce principles. The results are known by laws of nature or expert knowledge and are used to train the system. A learning algorithm attempts to find a hypothesis, which makes predictions as unerring as possible. In that, hypothesis means an image, which allocates the assumed output value to each input value. For that, the algorithm changes the free parameters of the selected hypothesis class. The method depends on an output to be learned, which is determined in advance, the results of which are known. The results of the learning process can be compared with the known, correct results, i.e. "monitored". Following training or a learning process, respectively, the system should be able to deliver a correct output for an unknown input similar to the learnt examples. In order to test these abilities, the system is validated. One possibility is to subdivide the available data into a training set and a test set. The objective is to minimize the error measure in the test set, which is not used for training. Cross-validation methods are frequently applied for that.

A support vector machine (SVM) is a classifier and subdivides a quantity of objects into classes, such that around the class limits an area remains free of objects, which area is as wide as possible. The support vector method is a purely mathematical method of pattern detection, which is implemented in computer programs. Starting point for the construction of a support vector machine is a quantity of training objects (training datasets), for which it is respectively known, which class they belong to. Each object (each dataset) is represented by a vector in a vector space. It is the task of the support vector machine to fit a hyper level into this space, which acts as a division level and divides the training objects into two classes. In that, the distance of those vectors closest to the hyper level is maximized. Later, this wide, empty margin is to provide that also objects, which do not exactly match the training objects, are classified as reliable as possible. Upon using the hyper level, it is not necessary to observe all training vectors. Vectors located further away from the hyper level and kind of "hidden" behind a front of other vectors, do not influence the location and position of the division level. The hyper level only depends on the vectors closest to it—and only those are required to describe the level in a mathematically exact fashion. These closest vectors are called support vectors, according to their function, and gave the support vector machines their name. A hyper level cannot be "bent", so that a clean separation with a hyper level is only possible, when the objects can be linearly separated. This generally is not the case in real applications. In case of data, which cannot be linearly separated, support vector machines use the kernel trick in order to insert a non-linear class limit. The idea behind the kernel trick is to transition the vector space, and thus also the training vectors located therein, into a higher-dimensional space. In a room with a sufficiently high number of dimensions—in case of doubt indefinite—even the most nested vector quantity can be linearly separated. In this higher-dimensional space, the separating hyper level is now determined. Upon retransformation into the lower-dimensional space, the linear hyper level becomes a non-linear, maybe even noncontiguous hyper area, which cleanly separates the training vectors into two classes (compare C.-C. Chang and C.-J. Lin: "LIBSVM: A Library for Support Vector Machines", Download citeseerx.ist.psu.edu/viewdoc/summary?doi=10.1.66.2871; Source csie.ntu.edu.tw/~cjlin/papers/libsvm.pdf; Archive CiteSeerX—Scientific Literature Digital Library and Search Engine (United States)).

The principal component analysis (PCA) is especially used in image processing and is a method of multivariate statistics. It serves structuring, simplifying and illustrating comprehensive datasets by approximating a multitude of statistical variables by a lower number of linear combinations as significant as possible (the "principal components"). The underlying dataset typically has the structure of a matrix of objects and their characteristics. Such a dataset can be illustrated as a quantity of n points in the p-dimensional space. It is the objective of the principal component analysis to project these data points into a q-dimensional subspace such that in that, as little information as possible is lost and present redundancy is summarized in the data points in the form of correlation. Mathematically, a principal axis transformation is performed. The principal component analysis is problem-dependent, because for each dataset, an independent transformation matrix must be calculated. The rotation of the coordinate system is executed such that the covariance matrix is diagonalized, i.e. the data are decorrelated (the correlations are the non-diagonal entries of the covariance matrix). For normally distributed datasets, this means that following PCA, the individual components of each dataset are statistically independent of one another, since the normal distribution is completely characterized by the zeroth (standardization), first (average value) and second moment (covariances). If the datasets are not normally distributed, then even after the PCA—although decorrelated now—the data will still be statistically dependent. Thus, in particular for normally distributed datasets, the PCA is an optimal method.

For the limit value method (first break picking), data are selected in a targeted fashion, which lie above or below a predetermined limit value (threshold value). For the STA/LTA quotient method, a quotient is formed from different average values of a parameter significant for the respective problem, and related to a specified, time- and case-dependent variable limit value, where applicable. Application of the limit value algorithm is in particular known from seismology (compare "Automatic time-picking of first arrivals on noisy microseismic data" of J. Wong et al., Conference Abstract Canadian Society of Exploration Geophysicists CSEG Microseismic Workshop 2009; "Automatic time-picking of Microseismic Data Combining STA/LTA and the Stationary Discrete Wavelet Transform" of I. R. Rodriguez, 2011 CSPG CSEG CWLS Convention).

The thesis "Hast Du's auf'm Schirm? Entwurf und Implementierung eines stabilen multifunktionalen Mehrkamera-Outdoor—Echtzeitsystems zur automatischen Objektdetektion im Infrarotbereich" (Marc Ritter, Mar. 19, 2007, Chemnitz University of Applied Sciences, thesis cited in "Entwurf eines Echtzeit-Bildverarbeitunssystems zur automatischen Erkennung von Walen im Umfeld der Antarktis" by Marc Ritter in "15 Jahre Künstliche Intelligenz an der TU Chemnitz" CSR-08-01, April 2008, pages 231 to 250), was initiated and supervised by the inventors of the present invention.

For the scan of the water surface, in the thesis, one visual camera with an acquisition angle of 24° and two infrared cameras with an acquisition angle of 12° or 7°, respectively, were used as infrared camera system in a stationary fashion (compare page 9, FIG. 1.5 of the thesis). The principal modular pipeline processing is shown on page 62, FIG. 5.1 and the associated module hierarchy on page 47, FIG. 4.2 of the thesis. In the entire processing, the image pre-processing represents an integral component of the entire detection process already (compare page 24, FIG. 2.2 of the thesis). In image pre-processing, the image data are stored in a ring buffer according to the FIFO principle (first in-first out) (compare page 53, Chapter 4.3.1. of the thesis). For image segmentation, the image is subdivided into weighted image parts, wherein, on the one hand, homogenous segmentation objects with similar characteristics, and on the other hand, object limits are found. With such weighted segmentation, however, relevant signals may be lost already. In image pre-processing already, using several. Gauss filters and empirically determined weighting values, it is attempted to improve the signal-to-noise ratio (compare page 68, Table 5.1 of the thesis). By filtering, however, relevant signals may likewise be lost. With the empirical determination of factors, data required for later classification may additionally be ignored. In detection, a Sobel filter is applied twice to the signal-enhanced image. In this, only the points of highest intensity (i.e. of highest edge steepness) are considered and used for classification. The local contrast remains unconsidered. Classification consists in an examination, whether five times (likewise a purely empirically determined value) in a row the highest edge steepness was detected at the same point in the image. Optimization in terms of an adjustment to current boundary conditions (changed environmental conditions) is not undertaken.

Verification, localization and documentation are not principal components of the known processing method. They are referred to only marginally in the thesis. For verification, it is only noted that stored data can be retrieved again via a playback function (compare page 52, Chapter 4.2.3 of the thesis). For localization in terms of location identification, global position data (GPS) can be integrated (compare page 54, Chapter 4.3.2 of the thesis). For documentation in terms of making information usable for further use, storage on durable data carriers (compare page 77 of the thesis, center) and chronological listing on a website (compare page 80 of the thesis, top) are mentioned.

Furthermore, from "MAPS: an Automated Whale Detection System for Mitigation Purposes" (of D. P. Zitterbart et al., SEG (Society of Exploration Geophysicists) Expanded Abstracts 30, 67 (2011) to International Exhibition and 81st Annual Meeting, San Antonio, USA, Sep. 18-23, 2011; initial publication on the Internet; doi:10.1190/1.3628169), individual aspects are known of the system comprehensively described in this patent application for the first time, which system uses an infrared camera (FIRST-Navy) for whale observation, which is attached to the mast of a research vessel. The infrared camera can observe a virtually full circle (300°) around the vessel, generates grayscale images and is gyroscopically compensated against vessel movements. Furthermore, a graphical user interface (Tashtego desktop, wherein Tashtego is a software developed by the Alfred Wegener Institute) is shown, which displays the current video and the ten video sequences recorded prior to that. Likewise, an enlarged image section and a recording loop of the last detected whale are displayed. In the current image, orientation lines for the horizon and various radii are displayed. Furthermore, images are shown with integrated zooms, distance data and water temperatures and with vessel-as well as geo-referenced cartographic recordings of detected whale blows. Furthermore, it is stated that processing comprises detection, verification, localization and documentation.

About the actual processing of the image data, however, there are no statements exceeding those from the above-cited thesis of Marc Ritter.

Furthermore, from US 2010/0046326 A1, a method for detecting whales is known, which, however, is based on an acoustic principle with sounds produced by the whale and other-generated sounds reflected by the whale.

Furthermore, airplane-aided infrared cameras were used, in order to undertake a census of Antarctic whale populations from the air. In the publication "infrared whale counting" (Keith Dartez, retrievable on the Internet at infraredinnature-.blogspot.com/ it is described that the footprint of the whales can be detected in the thermographic image with a completely calm sea. However, no automatism for detection of these signatures is described, just as airplane-aided observation for the case of mitigation of noise-generating anthropogenic work described there cannot be implemented logistically, since airplanes cannot monitor the surroundings of a vessel or a platform uninterruptedly for several months.

SUMMARY

In an embodiment, the present invention provides a method for automated real-time acquisition of a marine mammal in a natural body of water in the surroundings of a vessel. A thermal signature of the marine mammal is detected by imaging thermographic scanning of the water surface with an infrared camera system so as to generate an image data stream of consecutive images. Each of the images is subdivided into individual pixels. A modular processing of the image data stream is performed in a computer including at least the following consecutive sub-processes implemented in individual computer components: performing an image pre-processing of each of the images including image buffering and image segmentation into individual snippets from unweighted sub-images via a plurality of the consecutive images with image orientation; detecting local changes in contrast in the images using a limit value algorithm based on a quotient of a short-term average value to a long-term average value under specification of a temporally adaptive limit value; classifying, using only respective snippets of the individual snippets which exceed the temporarily adaptive limit value, the detected local changes in contrast so as to detect a pattern of the thermal signature of the marine mammal, the classifying being performed by monitored learning using a support vector method with an m-dimensional hyper level calculated by specification of selected training datasets and parameters of a grading into two classes above and below the hyper level, wherein only the respective snippets exceeding a decision value as a distance to the hyper level are allocated to a class corresponding to the thermal signature of the marine mammal; localizing, using only the snippets exceeding the decision value, the classified thermal signature of the marine mammal at least using global position data of the vessel, the localizing including performing calculations, in an automated manner, of a distance of the detected thermal signature of the marine mammal and a temporal and a spatial change to at least one of the vessel and devices located in the body of water in the surroundings of the vessel, the calculations and the snippets exceeding the decision value being passed on for at least one of verification and documentation; verifying the classified, localized thermal signature of the marine mammal by subjecting the snippets exceeding the decision value to an instantaneous true or false decision by an operator, the snippets and the respective decisions being automatically or manually supplied to the training datasets; and documenting the classified, localized and verified thermal signature of the marine mammal with at least one permanent storage of image data in the image data stream and with a pictorial representation of the processed image data stream on a graphical user interface of the computer, the documenting including storing, in an automated fashion, user-specific image data of the marine mammal together with associated details from the localizing.

BRIEF DESCRIPTION OF THE DRAWINGS

Embodiments of the method for automated real-time acquisition of marine mammals in natural bodies of water according to the invention are in the following explained in more detail on the basis of the figures for further understanding of the invention. In that, the figures show.

DETAILED DESCRIPTION

Figure 1:
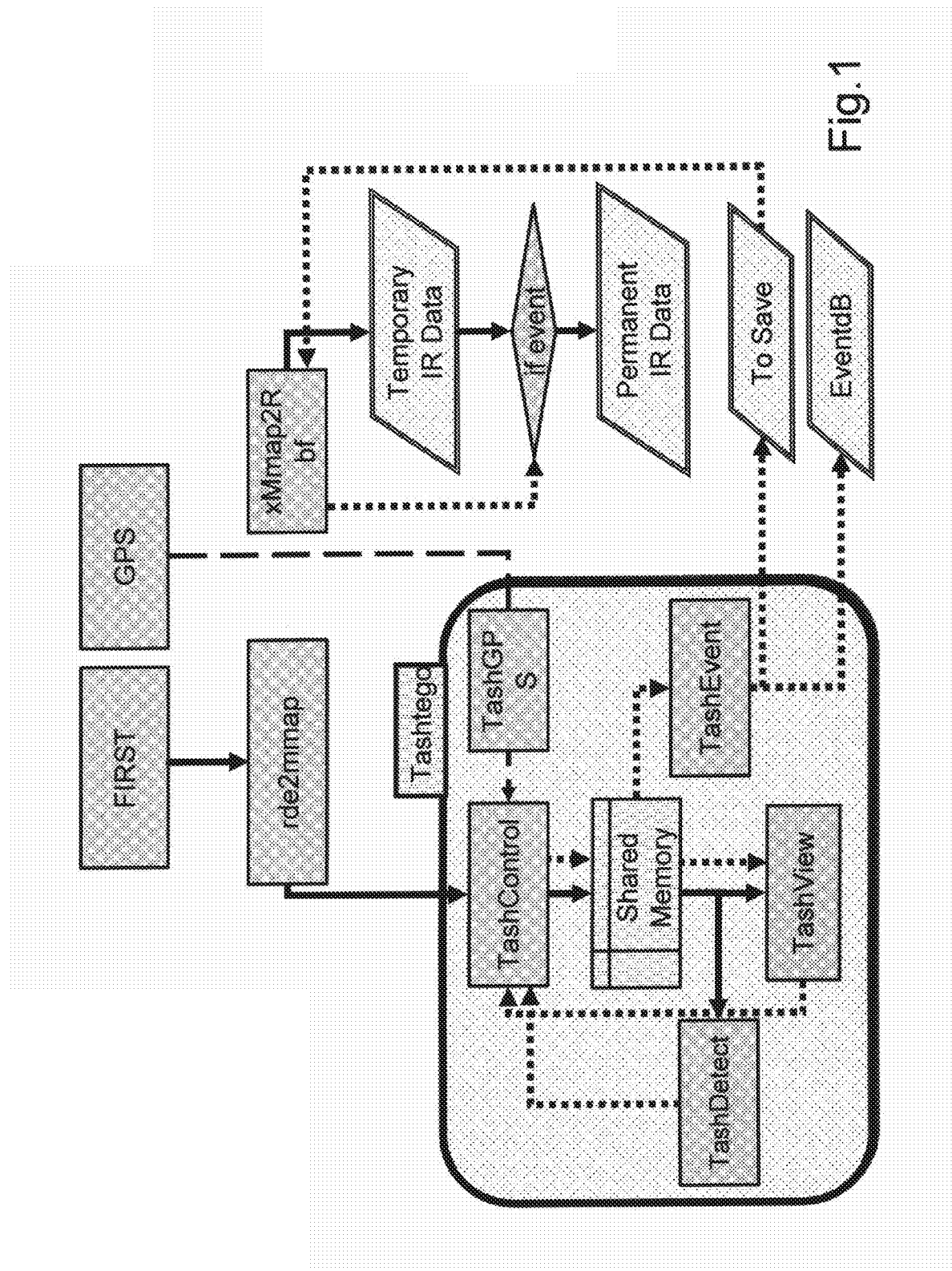
FIG. 1 the setup logic of the software Tashtego.

Since sightings within the mitigation radius result in a cost-intensive (up to several 100,000.00€ per day) switch-off or delay of the seismic investigations, there is a conflict of interest between the interests of animal protection or protection of species, respectively, as well as the mitigation conditions derived therefrom and the exploration order of the operating company of the seismic vessel. For this reason, in addition to a daytime-independent acquisition of emerging animals as objective as possible, an immediate verification of these observations is desirable. Furthermore, for the decision inside or outside the mitigation radius, localization relative to the vessel and in a geo-referenced fashion is necessary. In order to be able to subsequently prove compliance with the mitigation conditions to approving authorities (incl. specified reporting), documentation of all sightings and the workload of the sighting efforts has to be furthermore aimed at. For these reasons, an automated, geo-referenced detection of marine mammals is desirable, which provides reproducible and instantaneously verifiable acquisitions, and documents these automatically.

In an embodiment, the invention provides a method for automated real-time acquisition of marine mammals in natural bodies of water in the vicinity of a vessel by detection of thermal signatures of the marine mammals using imaging thermographic scanning of a water surface with an infrared camera system serving the generation of an image data stream of consecutive images, wherein each image is subdivided into individual pixels, and subsequent modular processing of the image data stream in a computer with at least the consecutive sub-processes implemented in individual computer components:

image pre-processing of each image with image buffering, image orientation and image segmentation into sub-images, detection of local changes in contrast in the image according to a predetermined algorithm, classification of the detected local changes in contrast for pattern recognition of the thermal signature of a marine mammal, localization of the classified thermal signature of a marine mammal at least considering the global position data of the vessel, verification of the classified, localized thermal signature of a marine mammal, and documentation of the classified, localized and verified thermal signature of a marine mammal with at least one permanent storage of the image data, and with a pictorial representation of the processed image data stream on a graphical user interface, which simultaneously serves operation of the method.

In detail, an embodiment of the present invention provides that:

in the sub-process "image pre-processing", the image vectors issued by the image sensor (UDP packets) are corrected for the individual pixel sensitivity and arranged in an image matrix (image/frame), within which the pre-orientation and horizon curve is determined and deposited for further analysis.

in the sub-process "detection", an automatic detection of local changes in contrast in 360 video streams is possible under different lighting and environmental conditions at distances of up to several kilometers, in the sub-process "classification", an instantaneous examination of detected local changes in contrast for their possible association with thermal signatures of marine mammals (whale blow, body heat or "footprint") is possible, in the sub-process "localization", an instantaneous determination of the distances signature-detector, signature-vessel's bow and signature-sound-generating device (air-gun) as well as the geo-referenced position and its suitable representation considering the location of the horizon in the image and the viewing direction of the camera is possible, in the sub-process "verification", an instantaneous independent examination of local changes in contrast classified as thermal signature in respect of the correctness of this allocation is possible, and in the sub-process "documentation", automatic storage of any approval-relevant information for electronic further processing on web (html) and print media is possible.

In that, the method to be stated is to deliver reliable results in real-time, and in that still be operable for the user as easy and comfortable as possible, one of the basic prerequisites for the acceptance of the method by the user.

In the method according to an embodiment of the invention, for the generation of individual images, i.e. the individual frames, first, a correction of the individual pixel sensitivity is undertaken in image pre-processing, as well as the pre-orientation within the image (image orientation) determined. Furthermore, the horizon line, possibly migrating due to dynamic residual errors in the vertical orientation of the imaging sensor, is determined and stored for the sub-process "localization". After that, the video stream is segmented into tiles with a known image position, which—across a few consecutive images—form the so-called (video) "snippets" (short video sections of a small image section). In image pre-processing, no weighting and no filtering are undertaken in the selection of the snippets, by which interesting signals could be lost. Instead, each individual image is subdivided into numerous, suitably arranged tiles. With the subsequent individual further processing of each individual snippet up to the sub-process verification, globally low-contrast anomalies can be detected, too, if they generate an increased contrast locally. For example, whale blows locally show a high contrast near the horizon, while in the full image compared to brightly appearing waves in the front image section they are relatively dark, thus globally contain little contrast. Here, the method claimed here is superior to the human being, since a bright area in the visual range results in a reduction of the pupil, and thus neighboring weak local changes in contrast in front of darker areas of the visual range are perceived less clearly or not at all.

Preferably and advantageously, in image segmentation, division into snippets with a position-dependent size (tiles, sub-image) and a duration of a few seconds, if applicable, may be undertaken, wherein each image is divided into a multitude of individual sub-images or also tiles (37577 tiles in the application example). These are relatively small (21×21 pixels in the application example) sub-images (tiles) overlapping by 50%, which guarantee that no information is lost, but real-time processing is still possible. In a recording of, for example, 3 images per second, a video sequence of 10 images (frames) lasts approx. 3 seconds. Thus, it is long enough to indicate changes, but short enough to be repeated in infinite loops.

In the claimed method, subsequently, in detection, a limit value algorithm on the basis of the quotient of a short-term average value to a long-term average value with a limit value for detection of the local change in contrast specified is used, wherein only snippets exceeding the limit value are passed on to classification. Detection serves examining the recorded video data stream for (transient and stationary) local changes in contrast and passing on image areas having local changes in contrast to the classifier. This is necessary, since classification of all image areas cannot be undertaken in real-time. In the sub-process of detection, the local contrast is not mentioned in the state of the art. Instead, in the state of the art, a misdetection results, as soon as, for example, a wave is brighter than a whale blow. Contrary to that, the method according to an embodiment of the invention works via a local change in contrast with a temporally adaptive limit value independent for each individual snippet. Therewith, it is achieved that the entire visible—optically permanently changing—water surface (near-field and far-field) can be equally analyzed. The STA/LTA detector thus observes local temporal changes in intensity and contrast and compares these with an adaptive limit value in order to be able to automatically adjust to changed image parameters (e.g. glare depending on the position of the sun, swell). Preferably and advantageously, in the claimed process, in detection, the STA/LTA algorithm with a temporally adaptive limit value (VLTA, threshold value) is calculated with $$VLTA = \overline{\left(\frac{STA}{LTA}\right)} + \lambda * \sigma\left(\frac{STA}{LTA}\right)$$

In that, STA is the short-term average value (for example across 2 images/frames in the application example), e.g. of the local contrast, LTA is the long-term average value (for example across 10 images/frames in the application example) of the local contrast, Lambda ($\lambda$) is a free parameter defining the sensitivity of the graphical user interface. Sigma ($\sigma$) describes the standard deviation of the STA/LTA quotient, and the horizontal bar describes the average value, respectively across N (for example 50 in the application example)

measurement values. Applying a VLTA calculated in such fashion, a reliable detection of local changes in contrast can be achieved.

In the method according to an embodiment of the invention, furthermore, in classification, monitored learning using the support vector method (more common "support vector machine") is undertaken, with a m-dimensional hyper level from decision values calculated by specification of selected training datasets and parameters, for grading into two classes above and below the hyper level, wherein only snippets exceeding the decision value of a class "blow" are allocated and passed on to verification. In classification, the decision is made, with which probability the previously detected local change in contrast is the thermal signature of a marine mammal or not. All parameters required for classification are directly learned by the algorithm from the data; in that, classification can be improved by any additional, verified thermal signature automatically or manually added to the database. The support vector method applied enables on the basis of a few examples the handling of new conditions, like, e.g., changed water temperature, wind speeds, lighting conditions, etc., which change the duration of the thermal signature and the local contrast. The learning algorithm (the "machine") uses the principal characteristics from already existing verified thermal signatures, and may therewith classify the local change in contrast as "thermal signature of a marine mammal" or "no thermal signature of a marine mammal". Thus, determined factors are specified, any data required for classification are learnt from the data themselves. The decision limit value "marine mammal/no marine mammal" is completely learnt independently on the basis of training data. Therefore, the algorithm is able to quickly adjust to new environmental conditions on the basis of few example data, considering various scenarios (e.g. water temperature, swell, species, ice drift).

On the basis of the following parameters, the SVM calculates an m-dimensional hyper level usable for classification:
the relevant N principal components of a $p_x \cdot p_y \cdot T/\tau$ dimensional snippet ($\tau$=frame rate, e.g. 3 images per second, T=duration of the snippet, $p_x, p_y$=number of pixels of the x- and y-axis of the tile) selected on the basis of a principal component analysis
the local contrast within a snippet
the global contrast between a snippet and the entire image, and
the distance of the snippet from the horizon.

Therefrom, the decision value is then calculated as the amount of the distance of the classified point from the hyper level. Furthermore, in the method according to an embodiment of the invention, in localization, calculation of the distance of the detected thermal signature is undertaken automatically. Thus, the distance to the animal (detected by its thermal signature) can be determined automatically. Based on that, it is possible to further process the detected signature position within the image to an absolute geo-referenced position of the signature by linking it with geo-referenced metadata (e.g. vessel position and orientation, camera position, orientation and position of the horizon in the image). With geo-referenced localization of successively detected thermal signatures, it is then possible to determine the spatial/temporal movement of the animal and to generate a projection of its swimming direction. Using this, pre-calculation of the time of the possible entry into the mitigation radius or collision with the vessel or to devices located in the water is possible. Advantageously and preferably, orientation and distance lines, in the image representation as well as in the map representation, can be superimposed in the overall image as well as in the snippets passed on for verification. Furthermore, further geo-referenced information (e.g. vessel track) can be integrated. The snippets assessed in localization may then be passed on to verification for instantaneous examination of the decision or directly to documentation.

Furthermore, in the method according to an embodiment of the invention, in verification, passed on snippets are subjected to an instantaneous decision "true" or "false" by an operator, wherein the snippets with the decisions made can be automatically or manually supplied to the training datasets in classification, for example by simple clicking of a human operator. Preferably and advantageously, in verification, at least ten sub-images from several passed on snippets can be simultaneously represented pictorially. Furthermore, in passed on snippets, the image area in the sub-image with the detected thermal signature with the same global position data can be pictorially represented in an enlarged fashion. Such measures are absolutely necessary to enable manual verification by a human operator. Preferably and advantageously, the operator may be an algorithm performing an automatic verification by combination of several thermal signatures and their position as determined by the above method, as well as inclusion of further external parameters, or a human being performing manual verification. Thus, the claimed method for detection of marine mammals can be verified automatically as well as manually. In both cases, it is advantageous that upon handover of a snippet from classification to verification, an automatic alert is sent to the operator.

Finally, in the method according to an embodiment of the invention, in documentation, user-specific image data of detected marine mammals are automatically made available together with the associated details from localization. Thus, automatic recording of the sightings is possible with image/video sequence, position, time and other measurement values, and thus problems of manual recording (typing errors, reading errors, missing entries for lack of time) are avoided. For that, FIFO storage with retrospective file backup via "ToDo" files can be provided. Furthermore, it can be preferably and advantageously provided that in documentation, the classified, verified and localized signatures are represented as map projections. Thus, electronic as well as hardcopy documentation is possible in a simple manner, which in particular is of special significance for approving authorities with strict conditions for the approval and execution of tests putting animals at risk.

The method according to an embodiment of the invention is comprised of a number of sub-processes, which are designed and implemented in a respectively simple fashion and can be passed through hierarchically. Preferably and advantageously, a further sub-process is implemented into the modular processing, which serves fitting of a global sinuidal horizon line by means of automatically or manually determined support points. A sinuidal course of the horizon line results from an (only difficulty recordable) inclination of the camera axis. This is not compensated by an active gyroscopic suspension for compensation of vessel movements compared to the horizon. Furthermore, preferably and advantageously, a further sub-process can be implemented into the modular processing, which serves predicting the swimming direction of the marine mammals on the basis of the spatial/temporal sequence of the detections. Thereby, the decision can be made, whether the detected marine mammal decreases its distance to the vessel (and thus increases the stress by airguns) or will soon leave the mitigation radius, so that the current measuring sequence does not have to be interrupted. Analogue to a detection of marine mammals, in addition, a detection of icebergs of any size (also micro icebergs) and other objects floating in the water may also be undertaken. With respective processing of the additional image data stream, a collision warning with the vessel or to devices located in the water in the surroundings of the vessel may be triggered. In case of approximation by a marine mammal, too, a collision warning may be advantageously triggered. Furthermore, possible troubleshooting is also quickly reduced to a certain sub-process. Preferably and advantageously, as errors, thermal influences on the infrared camera system upon thermal scanning and blurring of the horizon can be computationally balanced by correction of the individual pixel sensitivity and thus compensated.

Since real-time processing is of particular significance in the automatic detection of marine mammals in the context of mitigation of anthropogenic noise inputs, modular processing is therefore advantageously and preferably undertaken in several parallel paths by computer components simultaneously. The computer components respectively are processors and storages. Expansion of the efficiency of the method according to an embodiment of the invention may simply be realized by providing further respectively configured computers.

Besides modular processing, the equipment components are of significance in the method according to an embodiment of the invention. In particular, it is especially preferred and advantageous, if the imaging thermographic scanning of the water surface with the infrared camera system is undertaken with one individual single- or dual-band infrared camera in a full circle (quasi-360° video data) or with several single- or dual-band infrared cameras in one pitch circle each, respectively with active gyroscopic compensation of vessel movements compared to the horizon. Preferably, upon imaging scanning of the water surface, at least three consecutive grayscale or color images per second can be generated. With such a system, extensive coverage of the entire surface around a vessel, for example a research vessel, in connection with the generation of an image data stream rich in information for secure guaranteeing of the acquisition of almost any thermal signature and—in case of thermographic IR data—demonstrably at water temperatures up to at least +10° C. within a specific detection radius is guaranteed. Furthermore, by linking the method according to an embodiment of the invention with a further high-resolution, automatically storing visual camera, which on the basis of the process data is automatically aligned with predicted sighting positions, species determinations on the basis of, e.g., the blow shape or the anatomy of the animal may be undertaken, too (retrospective, verifiable species identification).

Seen in summary, the claimed method according to an embodiment of the invention with all its design options thus offers the following particular advantages:
- continuous monitoring of almost 360° (depending on the installation site), 24 hrs a day, for several months at a time;
- independence of daylight;
- reduction of staff requirement to one operator;
- independence of the acquisition rate from the subjective effectiveness of human observers;
- objectified detection/classification algorithm independent of the experience of individual human observers
- possibility for independent verification by third parties by means of a FIFO buffer of video clips showing the last 10 auto-acquisitions;
- precise, swell-independent automatic localization and thus distance determination of the acquisitions;
- automated or manual continuous determination of the pre-orientation of an image as well as determination of the course of the horizon in the image;
- objective determination of the swimming direction, speed and respiratory frequency of the animal as well as generation of a collision prognosis;
- automatic documentation of all vessel/marine mammal encounters for verification of the activities with control authorities;

Further details of embodiments of the invention are indicated in the following in connection with the description of an example.

As an example serves the implementation of the method according to an embodiment of the invention for automatic acquisition of marine mammals by means of thermographic methods in a system on "Polarstern", the research vessel of the Federal Republic of Germany, owner: Foundation Alfred Wegerner Institute (AWI) for Polar and Marine Research, Bremerhaven, Germany.

For recording the thermographic images serves a thermographic scanner ("FIRST-Navy") of the company Rheinmetall Defence Electronics. Representation, acquisition and storage of the data is undertaken by a so far unpublished software "Tashtego" developed at AWI for automated detection of thermal signatures of marine mammals by means of infrared cameras (see FIG. 1). For easier parallelization, the software was developed in a completely modular fashion. The modules are functional independent of one another, whereby in case of an error, troubleshooting is significantly facilitated, since only the respective module, and not the entire software, must be searched for the error. In that, the individual blocks mean:

| | |
|---|---|
| FIRST | FIRST-Navy sensor sending UDP packets to the data acquisition sub-network |
| GPS | GPS sensor and further metadata from the vessel's information system |
| rde2mmap | Part of the image pre-processing process. Driver converting UDP packets into a raw data image in a memory map and writing it into a ring buffer. |
| Tash GPS | Processing of the navigation data Storage and provision of these further metadata for retrospective analysis/validation |
| TashControl | Process "image pre-processing" Receipt of the raw data images and conversion into sensitivity-corrected images Storage of the images in "shared memory" Determination of the orientation of the images (ahead) Determination of the course of the horizon Automatic setting of the optimal global contrast for overall image representation (TashView) |
| Shared Memory | Central image storage, implemented as ring buffer. Central data storage for inter-process control. |
| TashDetect | Process for detection of local changes in contrast |
| TashEvent | Process for classification of detected local changes in contrast in respect of thermal signatures of marine mammals, automatic recording of detected thermal signatures. |
| TashView | Representation of the overall image, zoom-in images, guidelines and representation and handling of the user interface (GUI) |
| EventDB | Database of the thermal signatures (snippets and metadata) |
| ToSave | Database of the datasets to be stored |
| xMmap2Rbf | Process for documentation generation of a multi-day ring buffer (temporary IR data) of the video data from which detection-dependently selected datasets can be permanently stored (permanent IR data) |

Figure 2:
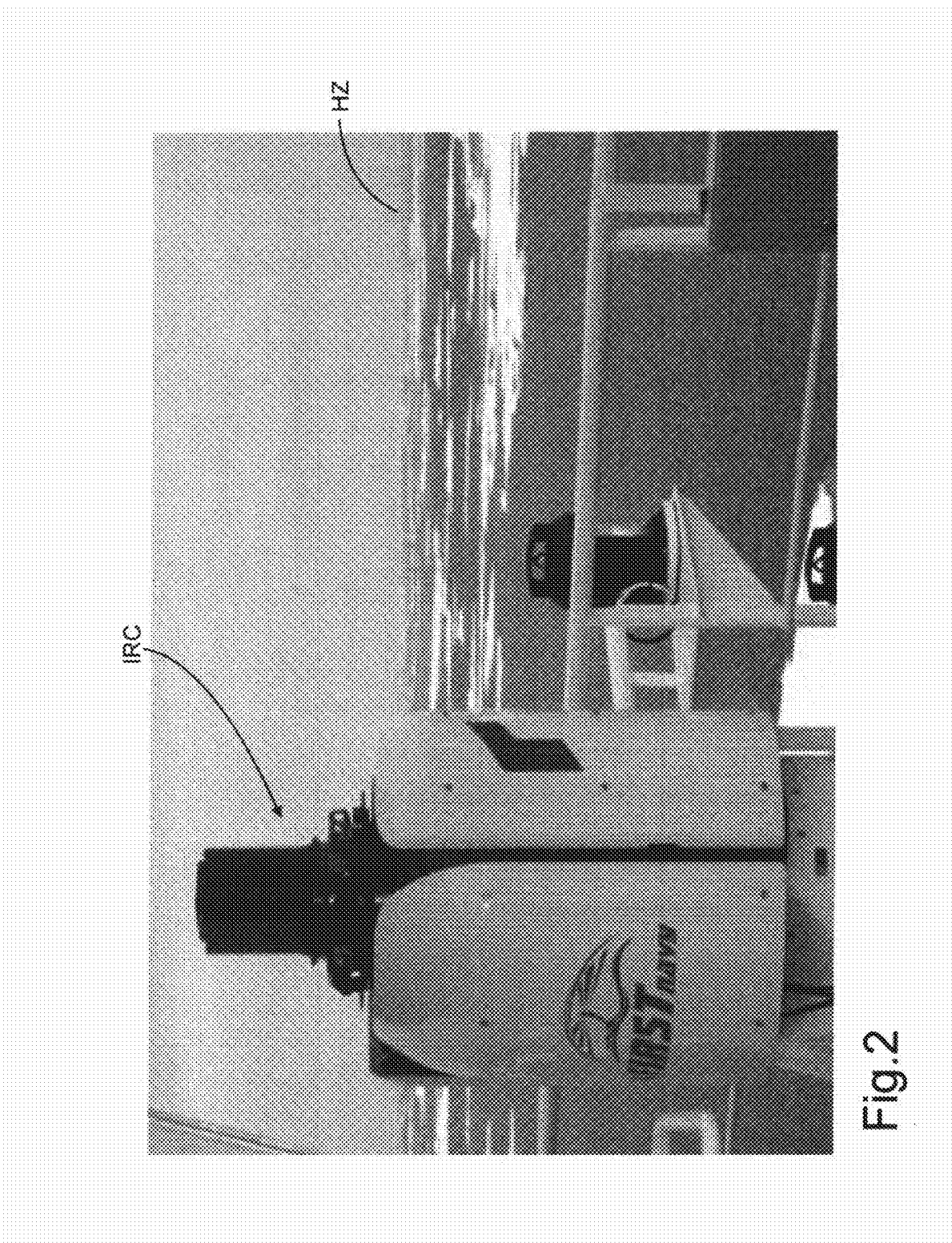
FIG. 2 infrared camera on board a vessel.

FIG. 2 shows an image of an infrared camera IRC onboard a vessel with a view on an ice-covered water surface in front of a horizon HZ. There is no thermal signature (whale blow, emerging animal or footprint).

Figure 3:
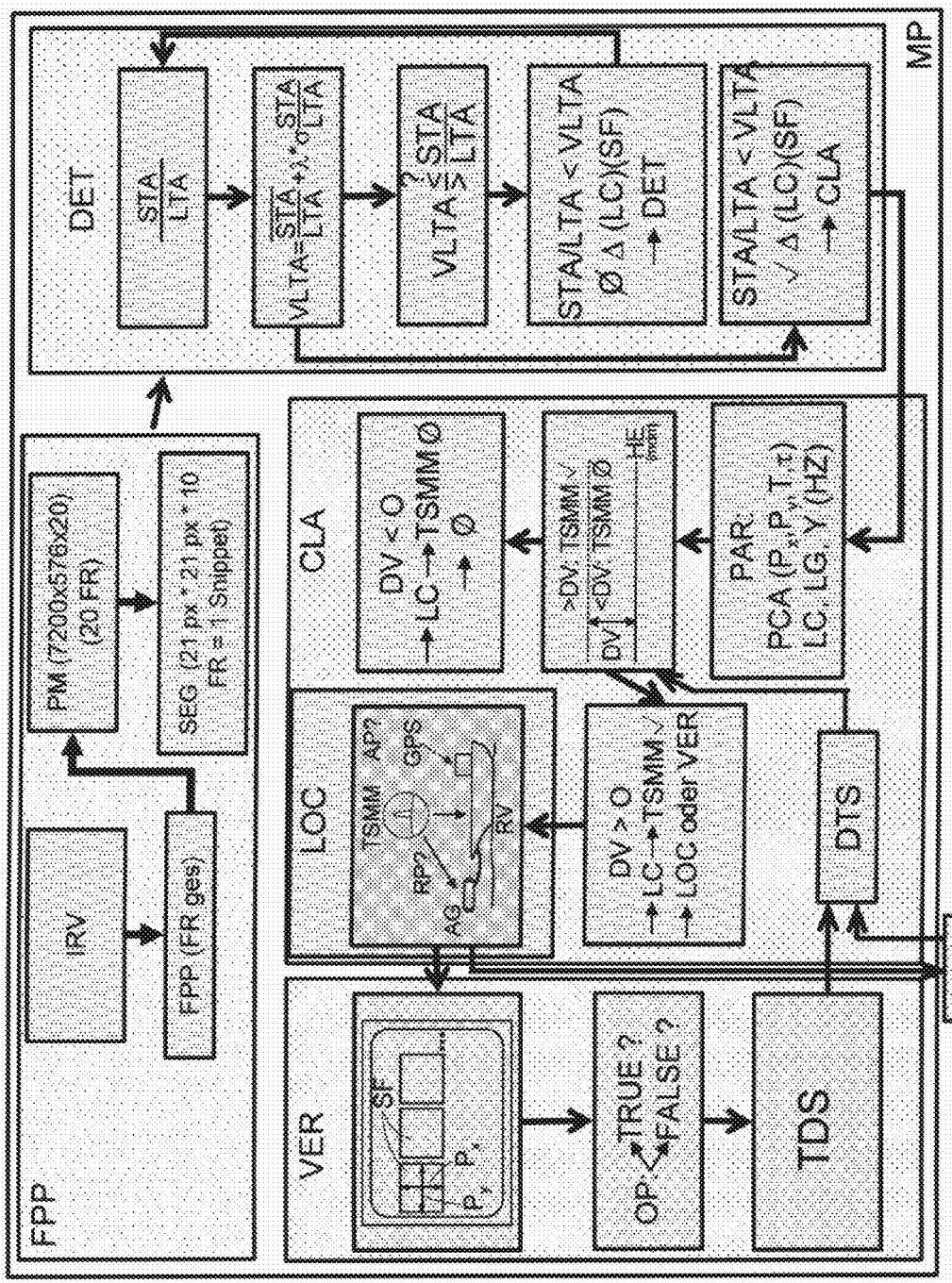
FIG. 3 the setup logic of the method according to an embodiment of the invention, FIG. 4 the efficiency of detector and classifier on the basis of a 10-day period, FIG. 5 photos of various, automatically acquired whale blows as thermal signature of a marine mammal, FIG. 6 the localization of a minke whale on the basis of its whale blow, relative to the vessel and geo-referenced, FIG. 7 a screenshot of the user interface of the Tashtego software, FIG. 8 three examples of detected whale blows, and FIG. 9 a map of detected whale blows.

The modules required for automatic detection of marine mammals according to an embodiment of the invention are described in the following. Automatic detection of marine mammals within the video data stream is structured into four sections (see FIG. 3 with the setup logic of the claimed method in the area of modular signal processing MP):

Image pre-processing FPP
Detection DET of local changes in contrast
Classification CLA of local changes in contrast
Localization LOC of thermal signatures
Verification VER of true/false positives by operator During image pre-processing FPP, the raw data from the IR camera IRV are corrected in respect of the different characteristic curves of the individual sensor elements (compensation, for example, of the heat impact of thermocouples), the image data are copied into an image buffer PM and this segmented into smaller image areas. Segmentation SEG is necessary in order to be able to check individual image areas in various software paths for the presence of thermal signatures of marine mammals TSMM. These image areas resulting from segmentation SEG (in the selected example 21 px*21 px*10 frames) are in the following called "snippets".

In detection DET, the detector step is already taking place for each individual snippet independent of one another. This processing at snippet level is maintained until verification. The detector DET uses an algorithm based on the "Short Term Average/Long Term Average (STA/LTA) Algorithm" known from seismology, and adapts it for detection of local changes in contrast. The idea of the STA/LTA algorithm was adjusted to two-dimensional data for each snippet and expanded by a temporally and spatially adaptive limit value (FB, here VLTA—Very Long Term Average). The algorithm characterizes occurring local changes in contrast by comparing the mean brightness across two differently long time domains. If the quotient of STA/LTA exceeds the limit value VITA, then the respective snippet is passed on to the classifier CLA. The limit value VLTA is due to extreme fluctuations in brightness (due to sun, waves, ice) different for each snippet and changes over time. In the application example stated, VLTA was calculated with $$VLTA = \overline{\left(\frac{STA}{LTA}\right)} + \lambda * \sigma\left(\frac{STA}{LTA}\right).$$

In that, STA is the short-term average value, e.g. of the local contrast, LTA is the long-term average value of the local contrast, lambda ($\lambda$) is a free parameter defining sensitivity. Sigma ($\sigma$) describes the standard deviation of the STA/LTA quotient, and the crossbar describes the respective average value, in the example across respectively 50 values (10 seconds). If the STA/LTA value within a snippet is higher than VLTA, $$\frac{STA}{LTA} > VLTA,$$

then this snippet is assessed as an interesting local change in contrast and passed on to the verifier VER. For example, STA may have the value 2 or 0.6 s and LTA the value 10 or 3 s, so that for values above 0.2 for VLTA, the snippet is passed on to verification VER.

The classifier CLA was implemented as a trained support vector method or support vector machine (SVM), respectively. In that, for measuring points located in an n-dimensional parameter space in two classes ("thermal signature of a marine mammal"–symbol TSMM ✓/"no thermal signature of a marine mammal"–symbol TSMM ø), an m-dimensional hyper level is found, which separates these classes considering various cost parameters (in order to avoid over-fitting). This hyper level is found on the basis of a training dataset, which was divided into two classes by hand. The parameters serving calculation of the hyper level are taken from 30 "thermal signature of a marine mammal" and 30 "no thermal signature of a marine mammal" snippets each. In the application example, on the basis of the following parameters, an m-dimensional hyper level usable for classification CLA was calculated by the support vector method SVM:

the relevant N principal component components of a 21×21×10 dimensional snippet gained following principal component analysis (PCA);
the local contrast LC within a snippet
the global contrast GC between a snippet and the entire image, and
the distance Y of the snippet from the horizon.

Therefrom, the decision value DV is then calculated as the amount of the distance of the classified point from the hyper level.

In localization LOC, the relative position RP of the detected thermal signature of the marine mammal TSMM to the vessel RV or submerged devices (AG), for example airguns, and the absolute position AP (GPS data) are automatically calculated. From localization LOC, the snippet is either directly passed on to documentation DOC (then the classification CLA is assumed as true) or automatically or manually checked in verification VER.

In verification VER, a number of sub-images SF are then simultaneously represented on the graphical user interface GUI for examination. The operator OP assesses them as either "true" T (a thermal signature of a marine mammal TSMM is present) or "false" F (no thermal signature of a marine mammal TSMM present).

Figure 4:
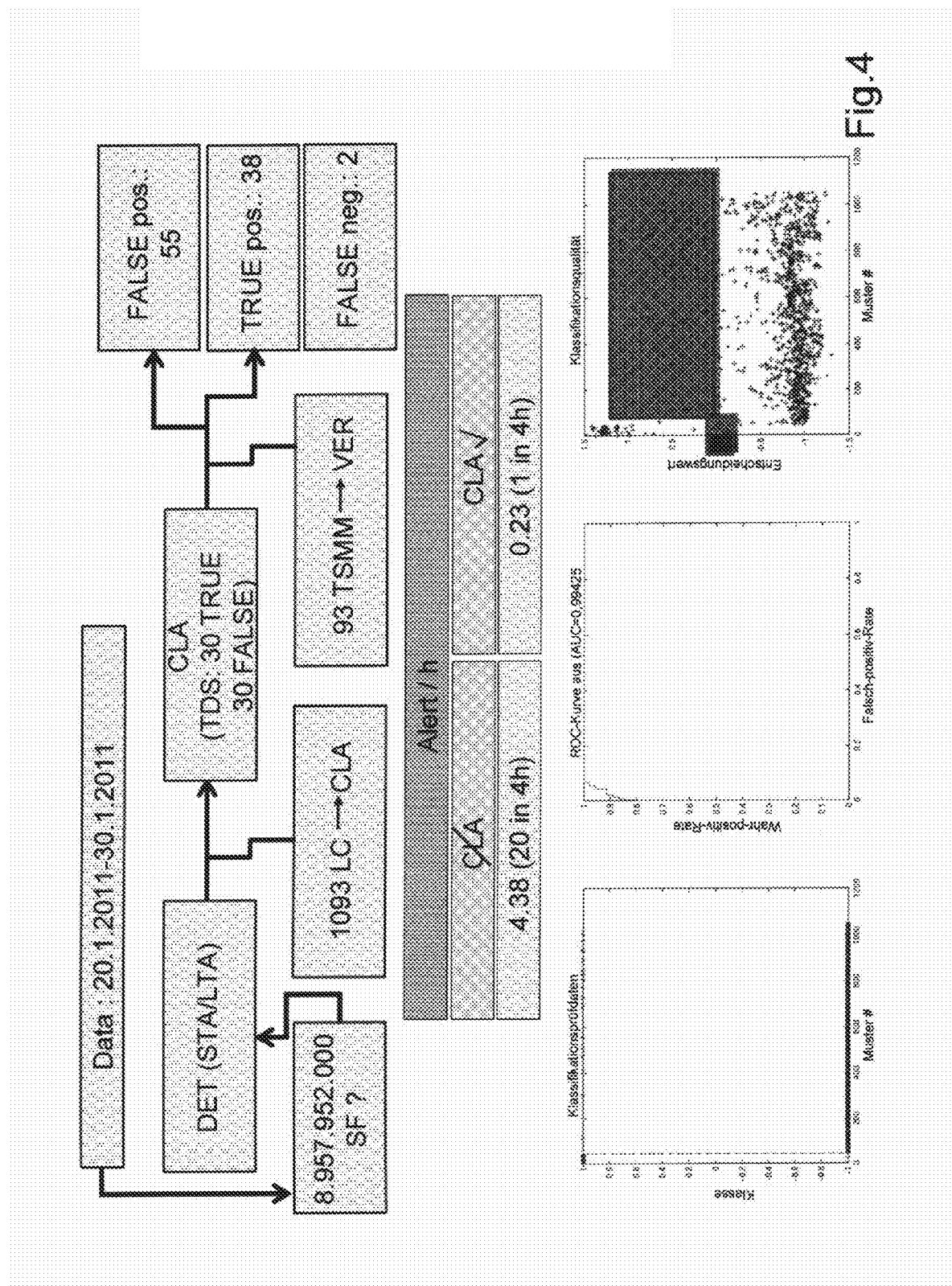

FIG. 4 represents an evaluation of the classifier CLA. Here, the data were analyzed across a 10-day period. Over this period, the detector DET marked 1093 local changes in contrast as interesting. The SVM model was trained with 30 data points "thermal signature of a marine mammal"/"no thermal signature of a marine mammal" each from another period. Here, the support vector machine SVM classified 93 of the 1093 detected changes in contrast as "thermal signature of a marine mammal" ("true"). Hereof, 55 "false positives" were classified as "false"—no thermal signature, 38 "true positives", i.e. classified "correctly"—thermal signature of a marine mammal. A further two events of the 1093 signatures provided by the detector were not recorded by the classifier, i.e. were "false negatives". For the operator, however, the number of false alarms/hour is important. On the basis of the classification by the support vector machine SVM, this was reduced from 4.38 to 0.23 per hour.

This makes the benefit of the method according to an embodiment of the invention clear. Instead of having several observers continuously (and at night, if necessary) monitor 360° for ten days, during this period, the system issued alarms only 93 times, which by a single operator could be verified on the basis of the recorded infinite video loop at random points in time. Approx. 50% of these alarms corresponded to "true positive", i.e. the presence of a marine mammal. Since one animal normally leaves several thermal signatures (multiple blowing, emerging), it is probable that all animals are thus acquired automatically, even if a few thermal signatures are not acquired automatically.

Figure 5:
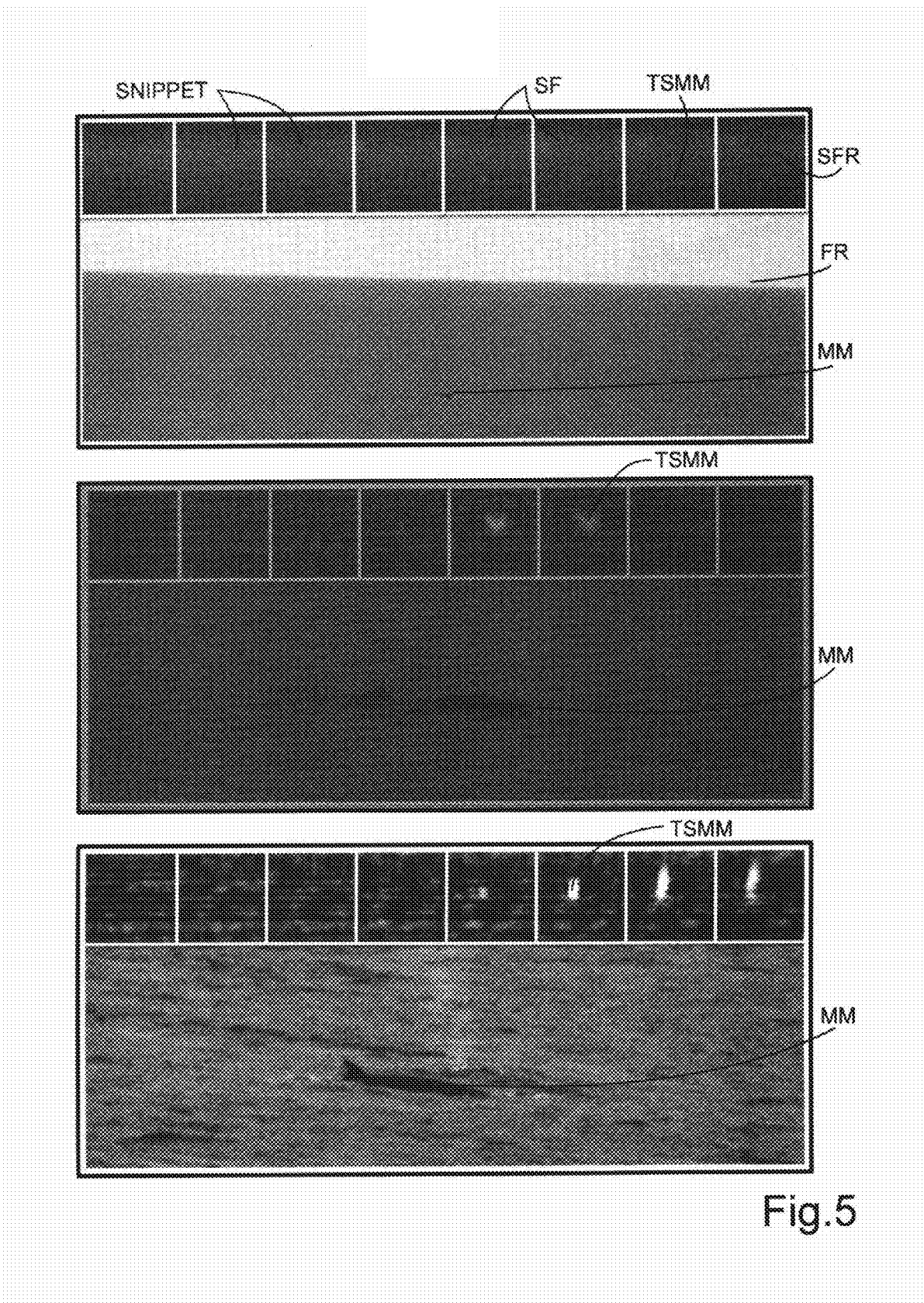

FIG. 5 shows images FR from automatic acquisition of a humpback whale; at the top, the detection of the whale blow can be respectively noticed in a sequence of sub-images SF, at the bottom then the entire whale. The top representation shows an automatic acquisition of a humpback whale at a distance of 5568 meters from the vessel: Start of IR sequence: 2011-01-13 20:43:03. Time of zoom photo: 2011-01-13 20:43:09-2. The middle representation shows an automatic acquisition of humpback whales at a distance of 1864 meters from the vessel. Start of IR sequence: 2011-01-13 20:50:59. Time of zoom photo: 2011-01-13 20:51:03-0. The bottom representation shows an automatic acquisition of a minke whale at a distance of 1525 meters from the vessel. Start of IR sequence: 2011-01-27 19:51:11. Time of zoom photo: 2011-01-27 19:51:14-8.

Figure 6:
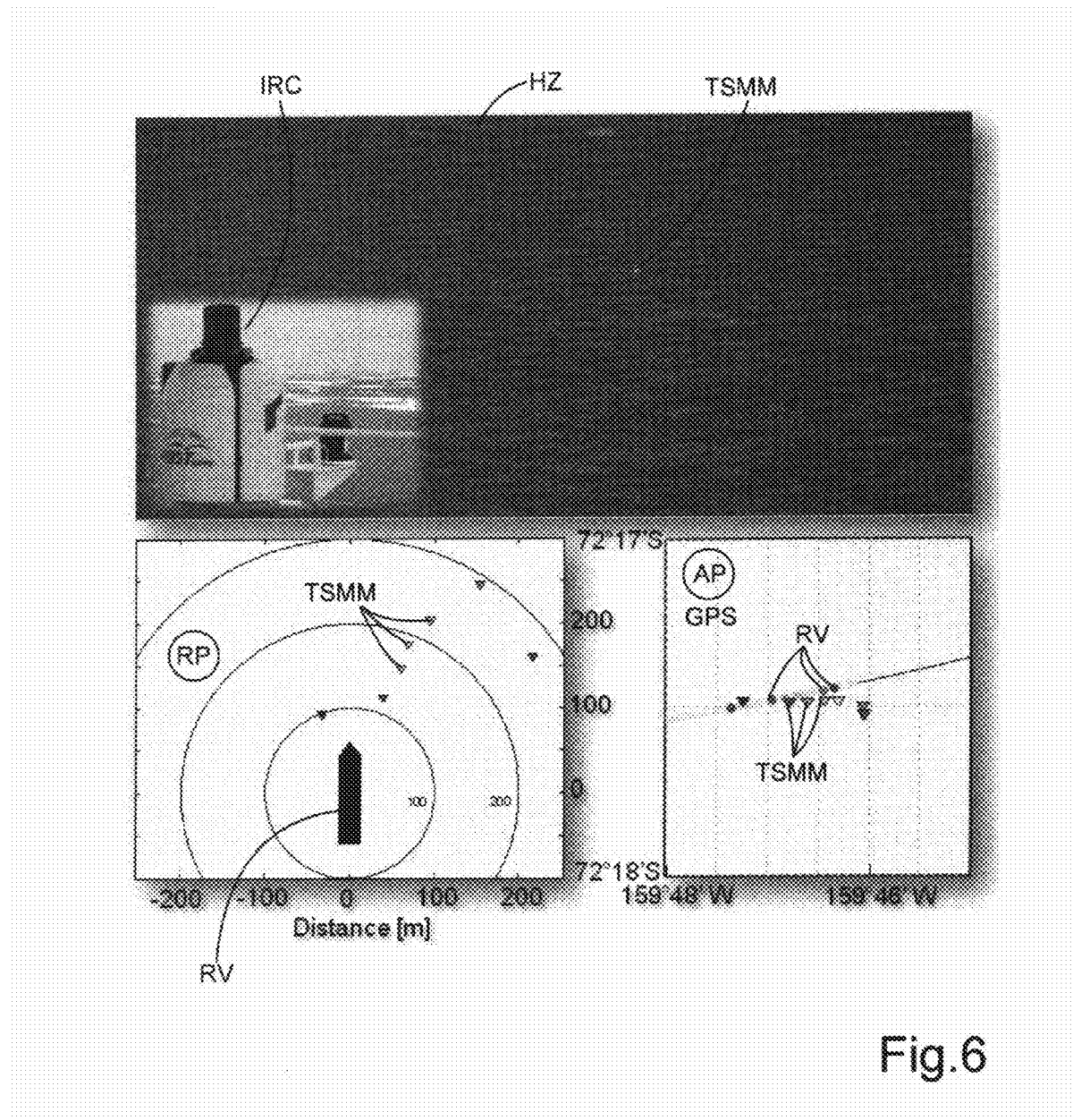

FIG. 6 shows the localization of a minke whale. In the top photo, the detected whale blow WS is encircled. On the lower left, a graphic of the detected whale blow relative to the vessel, and on the lower right, a graphic in a geo-referenced form are represented.

Figure 7:
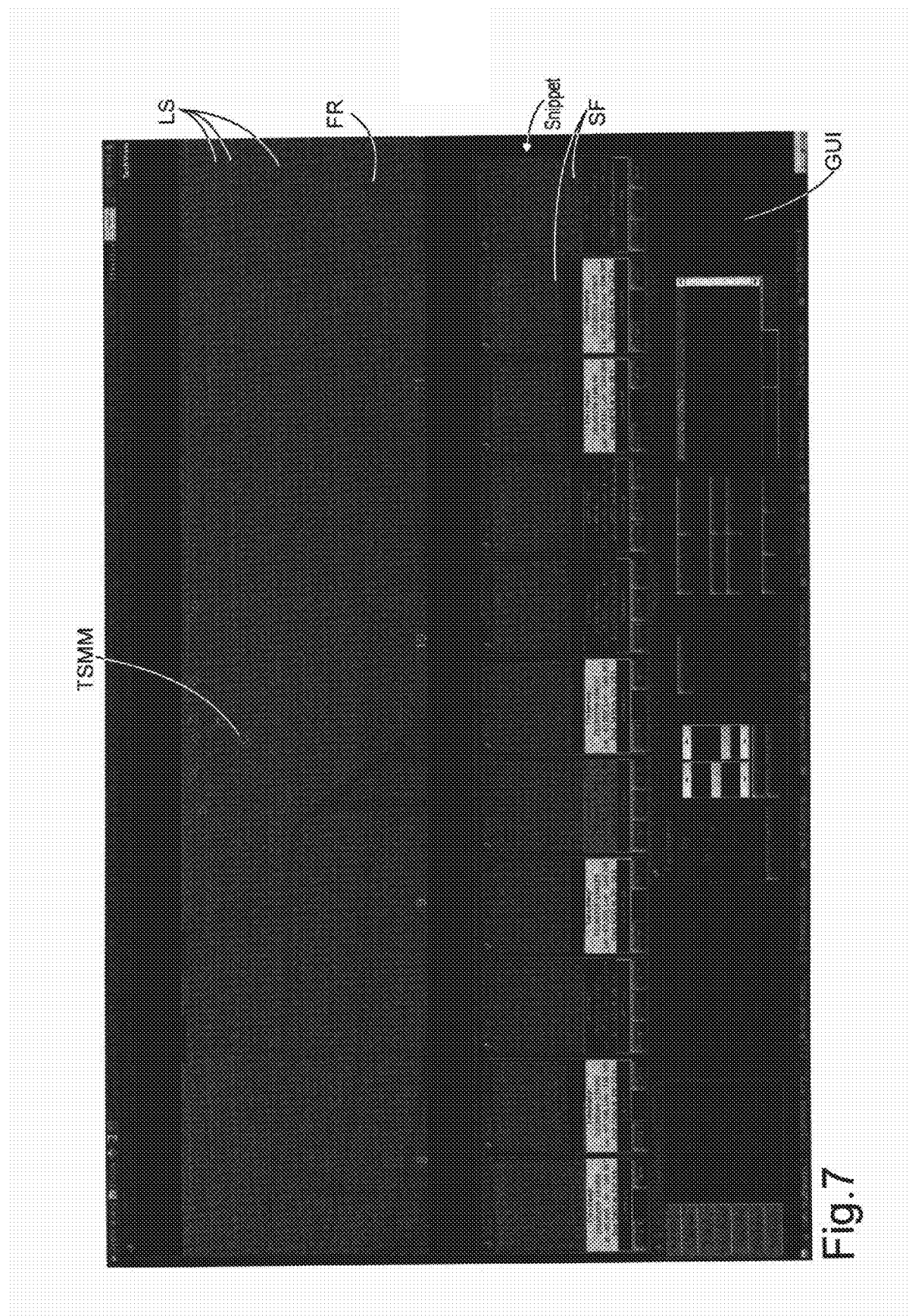

FIG. 7 shows a screenshot of the user interface GUI (the dark user inter fac was intentionally chosen in order to maximize visibility of the warm signatures (normally shown in white) and to avoid dazzling of the vessel's bridge staff upon use at night) of the Tashtego software (display extends over three widescreen displays, here represented rotated by 90°). The window in the upper image section represents the vessel's surroundings in real-time. Various orientation and distance lines LS are shown. Ten small windows in the lower image section show 2-second loops of the last events (thermal signatures). The window in the right-hand image area shows an enlarged section respectively in a 10-second loop and in a tracking view, in which the respective geo-coordinates of the last event are tracked. In the lower left image area, the status of the system and control windows are shown.

Figure 8:
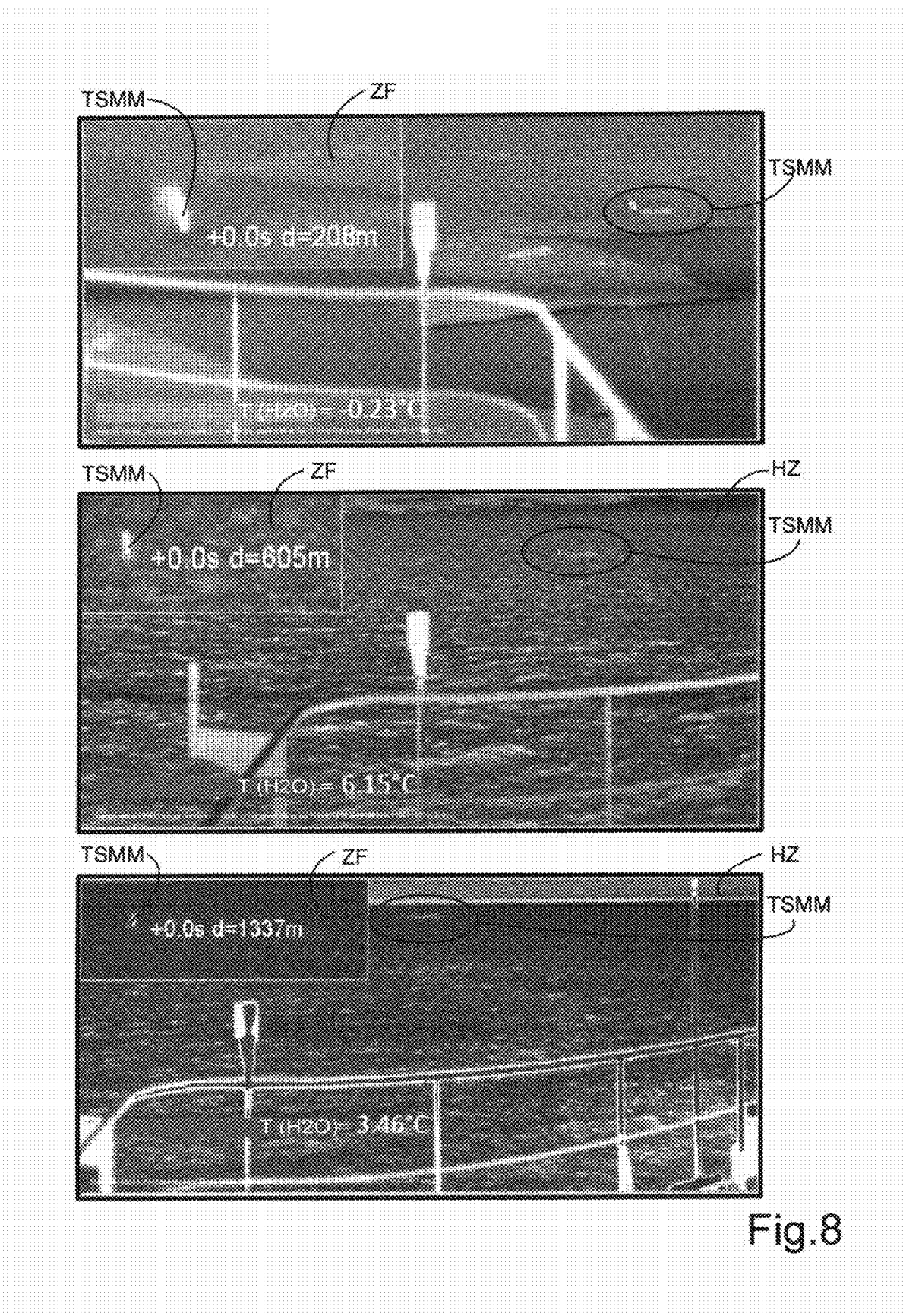

FIG. 8 shows three examples of whale blows as thermal signatures of marine mammals TSMM at various distances and at various water temperatures $T(H_2O)$, respectively with enlarged image areas ZF as inserts.

Figure 9:
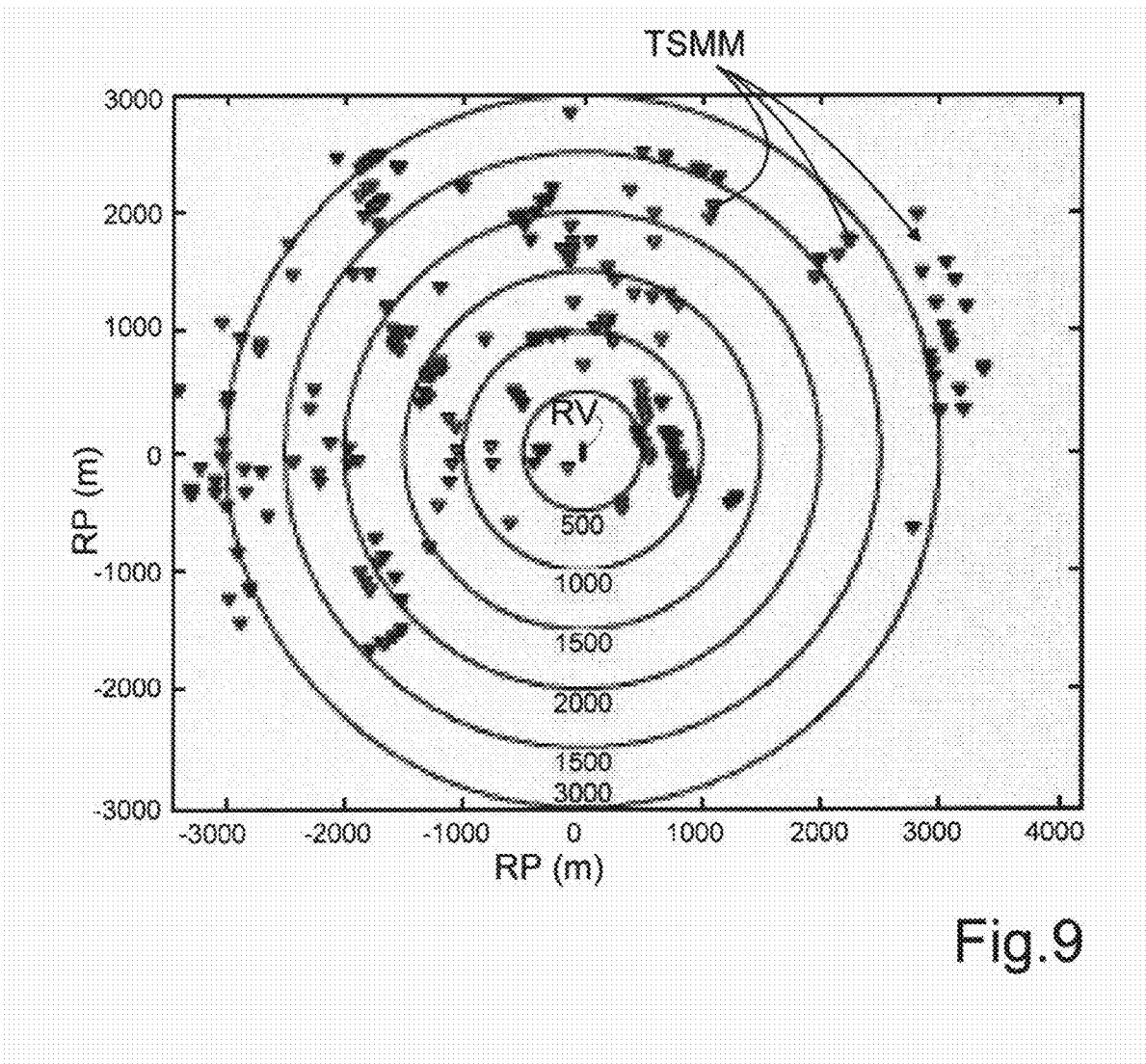

FIG. 9 shows a map with a representation of detected and verified whale blows as thermal signatures of marine mammals TSMM in the surroundings of the vessel RV across the period of an entire expedition.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

LIST OF REFERENCE SIGNS

AP Absolute position
AG Device (air-gun)
ALERT Alarm
CLA Classification
COM Computer
DET Detection
DOC Documentation
DV Decision value
FALSE Decision "false"
FPP Image pre-processing
FR Image
GC Global contrast
GPS Global position acquisition
GUI Graphical user interface
h Hour
HE Hyper level
HZ Horizon
IRC Infrared camera system, infrared camera
IRV Image data stream, image data
λ GUI setting factor
LC Local contrast
LOC Localization
LS Orientation and distance line
LTA Long-term average value
MM Marine mammal
MP Modular processing
OP Operator
PAR Parameter
PCA Principal component analysis
PM Buffer storage/image buffer
$P_x$ Pixel in the direction of the X image axis
$p_y$ Pixel in the direction of the y image axis
σ Standard deviation
RV Research vessel
RP Relative Position
s Second
SEG Image segmentation
SF Sub-image, tile
SNIPPET Short sequence of sub-images
SP Sub-process
STA Short-term average value
SVM Support vector method (machine)
T Duration of a snippet
$T(H_2O)$ Water temperature
TDS Training dataset
TSMS Thermal signature of marine mammals
TRUE Decision "true"
τ Image rate (FR/s)
VER Verification
VLTA Very long long-term average value
Y Distance of snippet from horizon
ZF Enlarged image area
✓ TSMM present, condition fulfilled, continue
ø No TSMM present, condition not fulfilled, end

The invention claimed is:

1. A method for automated real-time acquisition of a marine mammal in a natural body of water in the surroundings of a vessel, the method comprising:
   detecting a thermal signature of the marine mammal by imaging thermographic scanning of a water surface with an infrared camera system so as to generate an image data stream of consecutive images;
   subdividing each of the images into individual pixels;
   performing a modular processing of the image data stream in a computer including at least the following consecutive sub-processes implemented in individual computer components:
      performing an image pre-processing of each of the images including image buffering and image segmentation into individual snippets from unweighted sub-images via a plurality of the consecutive images with image orientation;
      detecting local changes in contrast in the images using a limit value algorithm based on a quotient of a short-term average value to a long-term average value under specification of a temporally adaptive limit value;

classifying, using only respective snippets of the individual snippets which exceed the temporarily adaptive limit value, the detected local changes in contrast so as to detect a pattern of the thermal signature of the marine mammal, the classifying being performed by monitored learning using a support vector method with a m-dimensional hyper level calculated by specification of selected training datasets and parameters of a grading into two classes above and below the hyper level, wherein only the respective snippets exceeding a decision value as a distance to the hyper level are allocated to a class corresponding to the thermal signature of the marine mammal;

localizing, using only the snippets exceeding the decision value, the classified thermal signature of the marine mammal at least using global position data of the vessel, the localizing including performing calculations, in an automated manner, of a distance of the detected thermal signature of the marine mammal and a temporal and a spatial change to at least one of the vessel and devices located in the body of water in the surroundings of the vessel, the calculations and the snippets exceeding the decision value being passed on for at least one of verification and documentation;

verifying the classified, localized thermal signature of the marine mammal by subjecting the snippets exceeding the decision value to an instantaneous true or false decision by an operator, the snippets and the respective decisions being automatically or manually supplied to the training datasets; and documenting the classified, localized and verified thermal signature of the marine mammal with at least one permanent storage of image data in the image data stream and with a pictorial representation of the processed image data stream on a graphical user interface of the computer, the documenting including storing, in an automated fashion, user-specific image data of the marine mammal together with associated details from the localizing.

2. The method according to claim 1, wherein the image segmentation is performed such that each of the snippets has a size of 21 pixels×21 pixels×10 images.

3. The method according to claim 1, wherein the limit value is calculated using the following formula:

$$VLTA = \overline{\left(\frac{STA}{LTA}\right)} + \lambda * \sigma\left(\frac{STA}{LTA}\right)$$

in which:
STA is the short-term average value;
LTA is the long-term average value;
$\lambda$ is a constant between 1 and 3 selected based on a resolution of said graphical user interface; and
$\sigma$ is a standard deviation across N measurement values of STA and LTA, and
the crossbar signifies an average value across N measurement values of STA and LTA.

4. The method according to claim 1, wherein the hyper level is calculated using parameters including principal components of one of the snippets selected based on a principal component analysis, local contrast within the snippet, global contrast between the snippet and an overall image and a distance of the snippet from a horizon, and wherein the decision value is calculated as the difference to the hyper: level.

5. The method according to claim 4, wherein the principal components include an image rate $\tau$ in images/s, a duration T of the snippet in s and a number of pixels $p_x$, $p_y$ of a sub-image in a horizontal (x) and in a vertical (y) direction of an image axis.

6. The method according to claim 1, wherein the classifying includes using thirty training datasets of the class corresponding to the thermal signature of the marine mammal and thirty training datasets of a class corresponding to no thermal signature of the marine mammal.

7. The method according to claim 1, wherein the localizing includes integrating orientation and distance lines that are represented in the pictorial representation.

8. The method according to claim 1, wherein the verifying includes simultaneously pictorially representing at least ten sub-images of the snippets.

9. The method according to claim 1, wherein the verifying includes pictorially representing, in an enlarged manner, an image area of the snippets with the detected local change in contrast and with equal global position data.

10. The method according to claim 1, wherein the operator is an algorithm performing automatic verification by a combination of relative distances of a plurality of detections or a human performing manual verification.

11. The method according to claim 1, wherein the snippets exceeding the decision value are passed on for the verifying, an alert to the operator being provided in an automated manner upon the snippets being passed on.

12. The method according to claim 1, wherein the documenting includes representing the classified, localized and verified thermal signatures of marine mammals as map projections.

13. The method according to claim 1, further comprising, in the modular processing as a further one of the sub-processes, fitting a global sinuidal horizon line using automatically or manually determined support points.

14. The method according to claim 1, further comprising, in the modular processing as a further one of the sub-Processes, at least one of:
predicting a swimming direction of the marine mammal based on a spatial/temporal sequence of detections; and
triggering a collision warning of a potential collision of the marine mammal with the vessel or the devices located in the body of water in the surroundings of the vessel.

15. The method according to claim 1, further comprising, in the modular processing as a further one of the sub-processes, at least one of:
processing an additional data stream of a detection of an iceberg of any size and other objects floating in the body of water; and
triggering a collision warning of a potential collision of the iceberg or one of the other objects with the vessel or the devices located in the body of water in the surroundings of the vessel.

16. The method according to claim 1, further comprising, in the modular processing as a further one of the sub-processes, compensating, in an automated manner, of occurring errors.

17. The method according to claim 16, wherein the compensating of errors includes compensating of at least one of thermal influences on the infrared camera system upon thermal scanning and blurring effects of a horizon by correcting individual pixel sensitivity.

18. The method according to claim 1, wherein the modular processing is performed simultaneously by computer components in a plurality of parallel paths.

19. The method according to claim 1, wherein the imaging thermographic scanning is performed using one or more single- or dual-band infrared cameras respectively in a full circle or in respective sub-circles and using an active gyroscopic compensation of movements of the vessel movements compared to a horizon.

20. The method according to claim 1, wherein the infrared camera system generates at least three consecutive grayscale or color images per second.

21. The method according to claim 1, wherein the detecting the thermal signature of the marine mammal is performed using an additional imaging camera configured to scan the water surface in the visible light range.

\* \* \* \* \*